(12) United States Patent
Weh et al.

(10) Patent No.: US 10,780,868 B2
(45) Date of Patent: Sep. 22, 2020

(54) HYDRAULIC BLOCK FOR A BRAKING SYSTEM OF A MOTOR VEHICLE, AND BRAKING SYSTEM FOR A MOTOR VEHICLE

(71) Applicant: Robert Bosch GmbH, Stuttgart (DE)

(72) Inventors: Andreas Weh, Sulzberg (DE); Juergen Tandler, Fuessen (DE); Matthias Mayr, Rettenberg (DE)

(73) Assignee: Robert Bosch GmbH, Stuttgart (DE)

( * ) Notice: Subject to any disclaimer, the term of this patent is extended or adjusted under 35 U.S.C. 154(b) by 82 days.

(21) Appl. No.: 16/077,211

(22) PCT Filed: Dec. 29, 2016

(86) PCT No.: PCT/EP2016/082799
§ 371 (c)(1),
(2) Date: Aug. 10, 2018

(87) PCT Pub. No.: WO2017/137135
PCT Pub. Date: Aug. 17, 2017

(65) Prior Publication Data
US 2019/0031164 A1    Jan. 31, 2019

(30) Foreign Application Priority Data
Feb. 12, 2016   (DE) .......................... 10 2016 202 113

(51) Int. Cl.
*B60T 8/36* (2006.01)
(52) U.S. Cl.
CPC .................................. *B60T 8/368* (2013.01)

(58) Field of Classification Search
CPC ......... B60T 8/368; B60T 8/4081; B60T 17/02
See application file for complete search history.

(56) References Cited

U.S. PATENT DOCUMENTS 5,681,097 A * 10/1997 Tackett ..................... B60T 8/36
                                                    137/454.2
6,688,707 B1 * 2/2004 Dinkel .................... B60T 8/368
                                                    303/119.3

(Continued)

FOREIGN PATENT DOCUMENTS

DE    102012213216 A1 *  2/2013  .............. B60T 17/00
DE    102014208884 A1    11/2015
(Continued)

OTHER PUBLICATIONS

English translation of WO 2013023953.*
International Search Report dated Feb. 20, 2017 of the corresponding International Application filed Dec. 29, 2016.

*Primary Examiner* — Thomas W Irvin
(74) *Attorney, Agent, or Firm* — Norton Rose Fulbright US LLP; Gerard Messina

(57) ABSTRACT

A motor vehicle braking system cuboidal hydraulic block includes at least one wheel connector to which at least one wheel brake cylinder is connectable, a master brake cylinder receiving borehole connected to the at least one wheel connector such that a master brake cylinder is at least partially providable in the master brake cylinder receiving borehole, and a plunger receiving borehole that extends from an engine side of the hydraulic block in the direction of an opposite side of the hydraulic block and that is connected to the at least one wheel connector such that a plunger of a motorized plunger device is providable therein.

16 Claims, 9 Drawing Sheets

(56) References Cited

U.S. PATENT DOCUMENTS

| | | | | |
|---|---|---|---|---|
| 7,322,658 | B2* | 1/2008 | Hinz | B60T 8/368 |
| | | | | 303/116.4 |
| 8,702,182 | B2* | 4/2014 | Fischbach-Borazio | ...................... |
| | | | | B60T 8/368 |
| | | | | 303/119.3 |
| 9,308,905 | B2* | 4/2016 | Biller | B60T 8/4081 |
| 9,365,199 | B2* | 6/2016 | Drumm | B60T 8/3655 |
| 9,517,757 | B2* | 12/2016 | Schlitzkus | B60T 8/368 |
| 9,586,565 | B2* | 3/2017 | Fellmeth | B60T 13/16 |
| 9,688,256 | B2* | 6/2017 | Weh | B60T 8/368 |
| 9,868,423 | B2* | 1/2018 | Weh | F04B 9/047 |
| 10,093,294 | B2* | 10/2018 | Mayr | B60T 8/368 |
| 10,308,232 | B2* | 6/2019 | Mayr | B60T 8/368 |
| 10,407,040 | B2* | 9/2019 | Jeon | B60T 13/146 |
| 2014/0062177 | A1* | 3/2014 | Fellmeth | B60T 13/686 |
| | | | | 303/6.01 |
| 2015/0298675 | A1 | 10/2015 | Mayr et al. | |
| 2018/0056955 | A1* | 3/2018 | Weh | B23Q 3/06 |
| 2019/0210576 | A1* | 7/2019 | Zander | B60T 17/04 |
| 2020/0031327 | A1* | 1/2020 | Mayr | F15B 15/1404 |

FOREIGN PATENT DOCUMENTS

| | | | |
|---|---|---|---|
| DE | 102014213732 A1 | 1/2016 | |
| DE | 102014225595 A1 | 6/2016 | |
| EP | 2883766 A1 | 6/2015 | |
| JP | 2007112441 A | 5/2007 | |
| WO | 2013023953 A1 | 2/2013 | |
| WO | WO-2013023953 A1 * | 2/2013 | ............. B60T 8/368 |
| WO | 2014090455 A1 | 6/2014 | |
| WO | WO-2018114090 A1 * | 6/2018 | ............ B60T 17/043 |

\* cited by examiner

HYDRAULIC BLOCK FOR A BRAKING SYSTEM OF A MOTOR VEHICLE, AND BRAKING SYSTEM FOR A MOTOR VEHICLE

CROSS-REFERENCE TO RELATED APPLICATIONS

The present application is the national stage of International Pat. App. No. PCT/EP2016/082799 filed Dec. 29, 2016, and claims priority under 35 U.S.C. § 119 to DE 10 2016 202 113.3, filed in the Federal Republic of Germany on Feb. 12, 2016, the content of each of which are incorporated herein by reference in their entireties.

FIELD OF THE INVENTION

The present invention relates to a hydraulic block for a braking system of a motor vehicle and to the braking system.

BACKGROUND

Braking systems are known from the related art which in addition to a master brake cylinder have a motorized plunger device. For example, DE 10 2014 208 884 A1 describes a braking system for a vehicle in which all wheel brake cylinders of the braking system are not only hydraulically connected to the master brake cylinder of the braking system, but are also attached to a motorized plunger device. The aim is for a pressure in the wheel brake cylinders to be variable in each case by adjusting a piston within a volume of the motorized plunger device. The intent is thus to allow an autonomous brake application to be carried out and/or a generator braking torque of a generator, used in addition to the braking system for decelerating the vehicle, to be blended.

SUMMARY

The present invention provides an arrangement of braking system components that is optimized with regard to material costs, weight, and space requirements of the braking system that includes the hydraulic block according to the present invention. In particular, with the aid of the present invention, 9-inch packaging is achievable in which (virtually) all braking system components are situated within a circle having a radius of 9 inches around the master brake cylinder receiving borehole (9*2.54 cm=22.86 cm). With such packaging, the implemented braking system is easily installable in a space-saving manner in a number of types of motor vehicles. In addition, the present invention provides a flat interface on the engine side and on the opposite side/control device side.

The optimized arrangement of the braking system components is achieved in that the plunger receiving borehole that extends from the engine side to the opposite side (directed away from the engine side) interpenetrates the hydraulic block. Sufficient mounting and adjustment volume for the at least one piston of the motorized plunger device is thus present within the plunger receiving borehole. The electric motor of the motorized plunger device for adjusting the at least one piston can be affixed directly on the engine side of the hydraulic block. A pole housing of the electric motor thus advantageously encloses a plunger gear unit of the motorized plunger device (protection from corrosion). The achievable direct connection of the electric motor on the engine side of the hydraulic block contributes to a more compact arrangement of the braking system components. In addition, a control device can be directly connected on the opposite side/control device side of the hydraulic block directed away from the engine side. It is not necessary for the plunger receiving borehole to penetrate the control device (or the circuit board that is used as a control device). Since sufficient surface area is thus available for the control device on the opposite side/control device side of the hydraulic block, an even more compact arrangement of the braking system components can be provided.

In one advantageous example embodiment, a simulator receiving borehole, which extends from a bottom side of the hydraulic block in the direction of a top side of the hydraulic block directed away from the bottom side, is provided in the hydraulic block, the simulator receiving borehole being designed, and connected to the master brake cylinder receiving borehole, in such a way that a simulator of the braking system is at least partially providable in the simulator receiving borehole. The present invention thus also contributes to equipping a braking system with a simulator (in addition to the master brake cylinder and the motorized plunger device) without significantly increasing the weight and/or space requirements of the implemented braking system. Due to providing the simulator receiving borehole on the bottom side, additionally equipping the braking system with the simulator also does not increase the quantity of material necessary for providing the hydraulic block.

The master brake cylinder receiving borehole preferably extends from the pedal side in the direction of the rear side along a first center longitudinal axis, the plunger receiving borehole preferably extends from the engine side to the opposite side of the hydraulic block along a second center longitudinal axis perpendicular to the first center longitudinal axis, and the simulator receiving borehole can extend from the bottom side in the direction of the top side along a third center longitudinal axis perpendicular to the second center longitudinal axis and the first center longitudinal axis. The perpendicular orientation of the master brake cylinder receiving borehole, the plunger receiving borehole, and the simulator receiving borehole with respect to one another results in even more compact packaging of the various braking system components.

In the hydraulic block, at least one valve receiving borehole that extends in each case from the opposite side in the direction of the engine side is preferably designed, and connected to the at least one wheel connector, to the master brake cylinder receiving borehole, to the plunger receiving borehole, and/or to the simulator receiving borehole, in such a way that at least one electrically controllable valve of the braking system is situatable in the at least one valve receiving borehole, and which during operation of the braking system is controllable with the aid of a control device of the braking system situated on the opposite side. A space-saving arrangement of the at least one electrically controllable valve of the braking system is thus also possible. In addition, the arrangement described here of the at least one electrically controllable valve of the braking system in the at least one valve receiving borehole provided on the opposite side simplifies controlling/switching of the particular valve with the aid of the control device that is situated in a space-saving manner.

For example, at least four wheel outlet valve receiving boreholes and four wheel inlet valve receiving boreholes are provided in the opposite side as the at least one valve receiving borehole, four wheel outlet valves of the braking system being situatable in the four wheel outlet valve receiving boreholes, and four wheel inlet valves of the braking system being situatable in the four wheel inlet valve receiving boreholes, the four wheel outlet valve receiving boreholes being situated in succession along a first row extending in a direction from a first edge of the opposite side adjoining the pedal side to a second edge of the opposite side adjoining the rear side, and the four wheel inlet valve receiving boreholes being situated in succession along a second row extending in the direction from the first edge of the opposite side to the second edge of the opposite side, and the first row of the four wheel outlet valve receiving boreholes being situated closer to a third edge of the opposite side, adjoining the top side, than the second row of the four wheel inlet valve receiving boreholes. As described in greater detail below, the arrangement of the wheel outlet valves and the wheel inlet valves described here is particularly space-saving.

Furthermore, a linear position sensor receiving opening can additionally be provided in the opposite side in such a way that a linear position sensor of the braking system that outputs at least one linear position signal to the control device during operation of the braking system is situatable in the linear position sensor receiving opening, the linear position sensor receiving opening being provided between the first row of the four wheel outlet valve receiving boreholes and the third edge of the opposite side. The arrangement described here of the linear position sensor receiving opening between the four wheel outlet valve receiving boreholes and the third edge of the opposite side on the top side of the hydraulic block allows at least one further receiving borehole to be additionally provided in the top side of the hydraulic block, which can be utilized, for example, for inserting at least one check valve.

In addition, at least one pressure sensor receiving opening can be provided in the opposite side in such a way that at least one pressure sensor of the braking system that in each case outputs at least one pressure signal to the control device during operation of the braking system is situatable in the at least one pressure sensor receiving opening, the at least one pressure sensor receiving opening being provided between the first row of the four wheel outlet valve receiving boreholes and the second row of the four wheel inlet valve receiving boreholes. The at least one pressure sensor receiving opening that is suitable for situating the at least one pressure sensor can be designed with a lower depth than the wheel outlet valve receiving boreholes and the wheel inlet valve receiving boreholes. Thus, the arrangement described here of the at least one pressure sensor receiving opening between the four wheel outlet valve receiving boreholes and the four wheel inlet valve receiving boreholes provides the option for situating the master brake cylinder receiving borehole at the level of the at least one pressure sensor receiving opening in a space-saving manner.

Furthermore, the plunger receiving borehole can be situated on the opposite side between the second row of the four wheel inlet valve receiving boreholes and a fourth edge of the opposite side adjoining the bottom side of the hydraulic block. The comparatively large-volume master brake cylinder receiving borehole and the likewise comparatively large-volume plunger receiving borehole can thus already be provided in a comparatively small hydraulic block in a space-saving manner.

In another advantageous example embodiment, a first shutoff valve receiving opening and a first plunger decoupling valve receiving opening are additionally provided in the opposite side as the at least one valve receiving borehole in such a way that a first shutoff valve of the braking system is situatable in the first shutoff valve receiving opening and a first plunger decoupling valve of the braking system is situatable in the first plunger decoupling valve receiving opening, during operation of the braking system a brake fluid path through the hydraulic block from the master brake cylinder receiving borehole to a first wheel inlet valve receiving borehole and a second wheel inlet valve receiving borehole of the four wheel inlet valve receiving boreholes being closeable with the aid of the first shutoff valve, and a brake fluid path through the hydraulic block from the plunger receiving borehole to the first wheel inlet valve receiving borehole and the second wheel inlet valve receiving borehole being closeable with the aid of the first plunger decoupling valve, and the first shutoff valve receiving opening and the first plunger decoupling valve receiving opening being provided between the first edge of the opposite side and the plunger receiving borehole in the opposite side. Additionally equipping the braking system, implemented with the aid of this example embodiment of the hydraulic block, with the first shutoff valve and the first plunger decoupling valve is thus possible without a (significant) increase in the space requirements of the hydraulic block.

Likewise, a second shutoff valve receiving opening and a second plunger decoupling valve receiving opening can be additionally provided in the opposite side as the at least one valve receiving borehole in such a way that a second shutoff valve of the braking system is situatable in the second shutoff valve receiving opening and a second plunger decoupling valve of the braking system is situatable in the second plunger decoupling valve receiving opening, during operation of the braking system a brake fluid path through the hydraulic block from the master brake cylinder receiving borehole to a third wheel inlet valve receiving borehole and a fourth wheel inlet valve receiving borehole of the four wheel inlet valve receiving boreholes being closeable with the aid of the second shutoff valve, and a brake fluid path through the hydraulic block from the plunger receiving borehole to the third wheel inlet valve receiving borehole and the fourth wheel inlet valve receiving borehole being closeable with the aid of the second plunger decoupling valve, and the second shutoff valve receiving opening and the second plunger decoupling valve receiving opening being provided between the second edge of the opposite side and the plunger receiving borehole in the opposite side. This is also a space-saving arrangement for additionally equipping a braking system, implemented with the aid of this example embodiment of the hydraulic block, with the second shutoff valve and the second plunger decoupling valve.

In particular, a simulator valve receiving opening can be provided in the opposite side as the at least one valve receiving borehole in such a way that a simulator valve of the braking system is situatable in the simulator valve receiving opening, during operation of the braking system a brake fluid path through the hydraulic block from the master brake cylinder receiving borehole to the simulator receiving borehole being closeable with the aid of the simulator valve, and the simulator valve receiving opening being provided between the second edge of the opposite side and the plunger receiving borehole in the opposite side. This also ensures optimized compactness, even with numerous braking system components.

A portion, adjoining the simulator valve receiving opening, of a section, extending from the master brake cylinder receiving borehole to the simulator valve receiving opening, of the brake fluid path extending from the master brake cylinder receiving borehole to the simulator receiving borehole preferably extends along an axis that is inclined by an angle between 10° and 80° with respect to the opposite side.

This allows pressure-assisted closing of the simulator valve in order to seal off a hydraulic connection between the master brake cylinder and the simulator. It can thus be ensured that, even in the event of a failure of the vehicle electrical system, the hydraulic connection between the master brake cylinder and the simulator is reliably sealed off with the aid of the simulator valve, so that undesirable braking into the simulator in such a situation does not have to be accepted.

In another advantageous example embodiment, a rotation sensor receiving opening is provided in the opposite side in such a way that a rotation sensor of the braking system that outputs at least one rotation position signal to the control device during operation of the braking system is situatable in the rotation sensor receiving opening, the rotation sensor receiving opening being provided between the fourth edge of the opposite side and the plunger receiving borehole in the opposite side. Likewise, at least one contact receiving opening can be provided in the opposite side in such a way that at least one contact of the braking system is situatable in the at least one contact receiving opening, and at which a voltage signal and/or current signal can in each case be output, applied, or tapped with the aid of the control device during operation of the braking system, the at least one contact receiving opening being provided between the fourth edge of the opposite side and the plunger receiving borehole in the opposite side. Both options allow the braking system to be equipped with the rotation sensor and/or the at least one contact in a space-saving manner.

The opposite side is preferably milled over, while the engine side, the bottom side, and/or the top side are/is not milled over. The effort for milling over the engine side, the bottom side, and/or the top side can thus be saved.

The above-described advantages are also provided in a braking system for a motor vehicle that includes such a hydraulic block. It is pointed out that the braking system can be refined according to the example embodiments of the hydraulic block described above.

Further features and advantages of the present invention are explained below with reference to the figures.

DETAILED DESCRIPTION

FIGS. 1a-1j show schematic overall and partial illustrations of a first example embodiment of the hydraulic block and of a braking system equipped with same.

Hydraulic block 10 schematically illustrated in FIGS. 1a-1j is usable to provide a plurality of braking system components of a braking system of a motor vehicle. Hydraulic block 10 is particularly suitable for a braking system of an electric vehicle or hybrid vehicle (for example, for blending a generator braking torque during deceleration with the aid of a generator). However, it is pointed out that usability of hydraulic block 10 or of the braking system equipped with same is not limited to a specific type of motor vehicle. Hydraulic block 10 can be advantageously used in virtually any type of motor vehicle (for example, for autonomous braking of the motor vehicle).

Figure 1A:
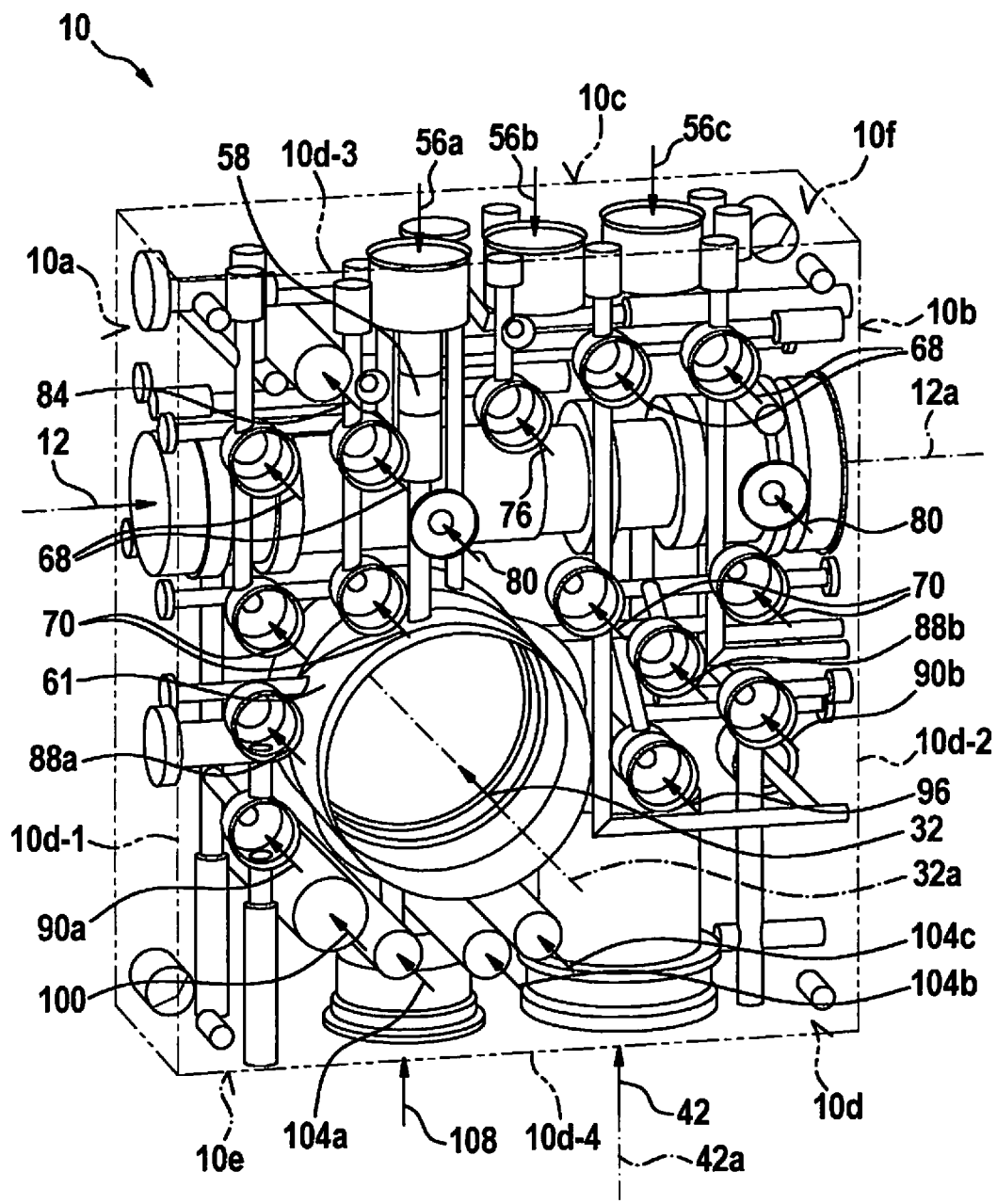
FIGS. 1a-1j show schematic overall and partial illustrations of a first example embodiment of the hydraulic block and of a braking system equipped with same.
Figure 1B:
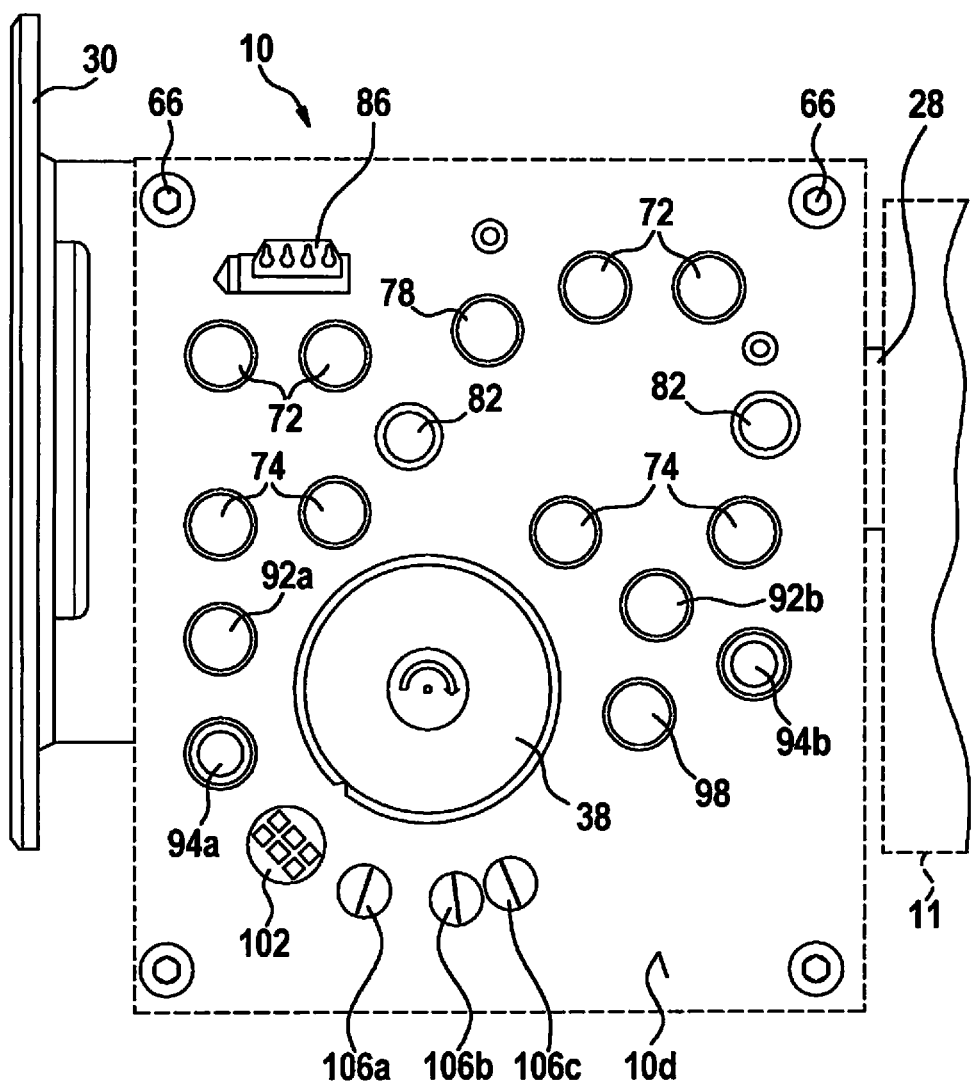
Figure 1C:
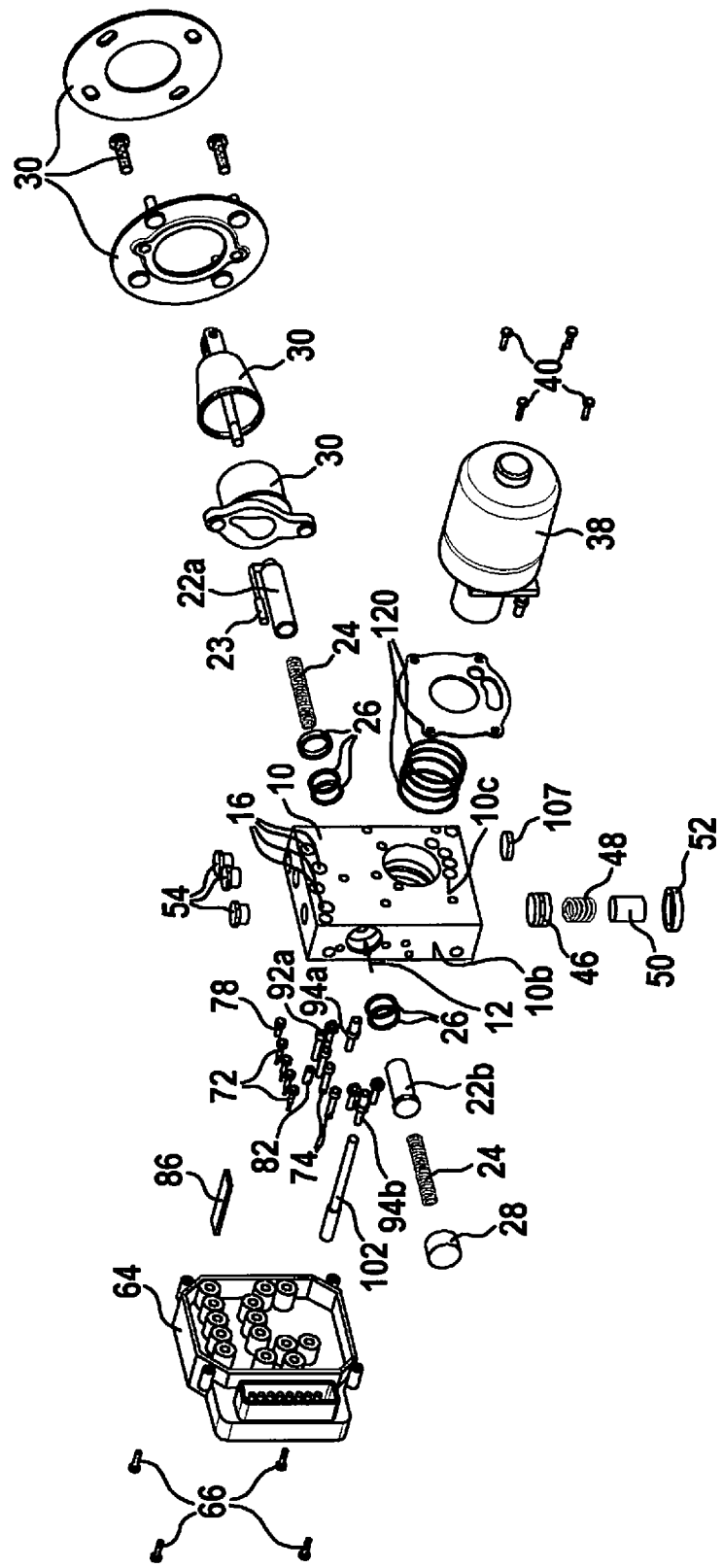
Figure 1D:
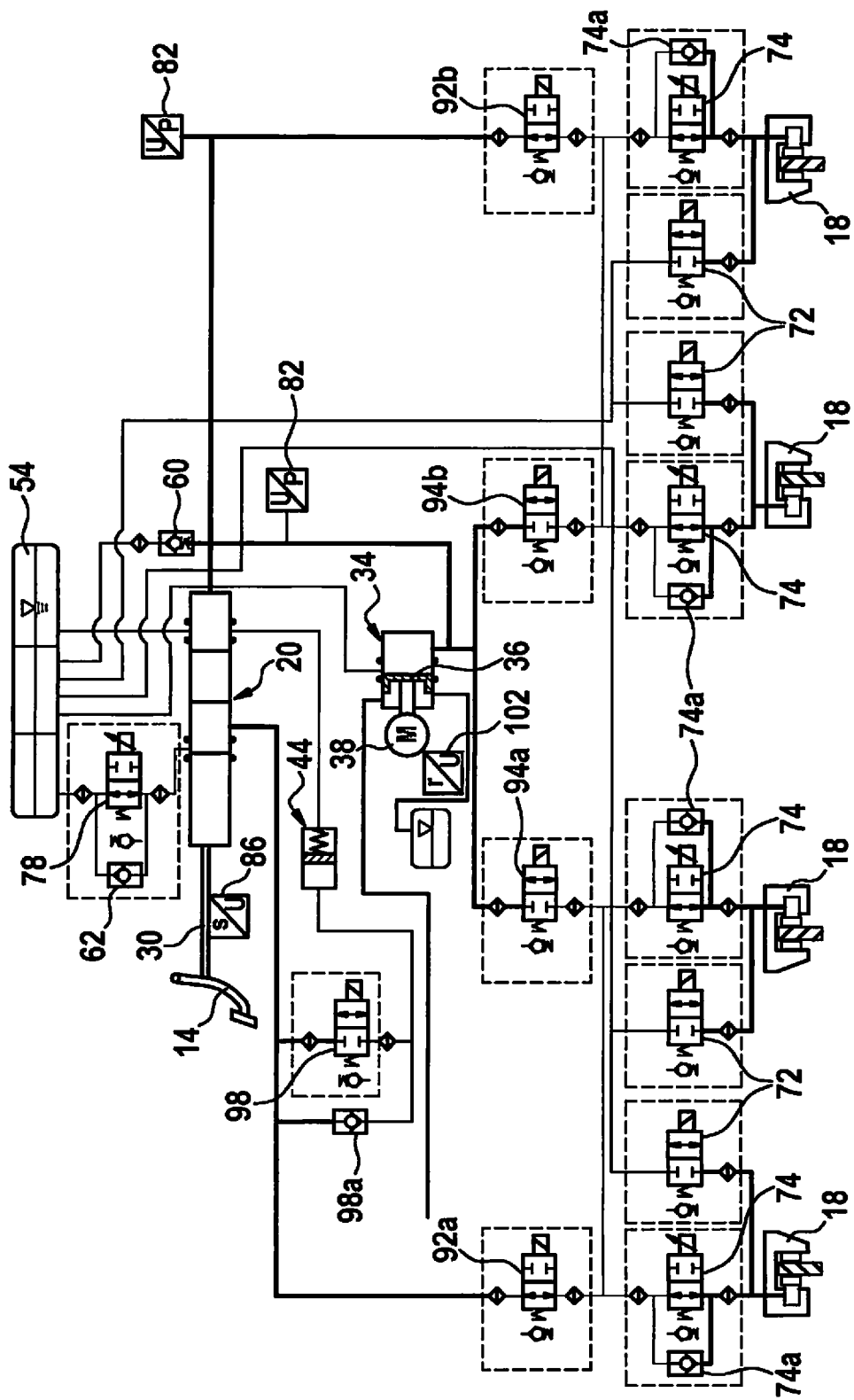

FIG. 1a shows a side illustration of overall hydraulic block 10. FIGS. 1b and 1c respectively show a side illustration of the braking system, having such a design, after it is installed on a bulkhead 11 of a motor vehicle, and an exploded diagram of the braking system. FIG. 1d illustrates a schematic circuit diagram of the braking system. FIGS. 1e-1j show schematic cross sections of portions of the braking system equipped with hydraulic block 10.

Hydraulic block 10 can also be referred to as a hydraulic unit. Hydraulic block 10 can include at least one metal, for example aluminum, and/or at least one plastic. Hydraulic block 10 can in particular be made completely of aluminum. However, instead of or in addition to aluminum, at least one other material can be used for forming hydraulic block 10.

Hydraulic block 10 is designed as a cuboidal block. A master brake cylinder receiving borehole 12 that extends from a pedal side 10a of hydraulic block 10 in the direction of a rear side 10b of hydraulic block 10 directed away from pedal side 10a is provided in hydraulic block 10. (Pedal side 10a of hydraulic block 10 can be understood to mean a side/surface of hydraulic block 10 oriented toward brake pedal 14 after installation of the braking system having such a design. Hydraulic block 10 can be fixed to rear side 10b at bulkhead 11, for example.) Also provided on hydraulic block 10 is at least one wheel connector 16 (see FIG. 1c), to which at least one wheel brake cylinder 18 of the braking system is connectable. (The at least one wheel connector 16 can be provided, for example, on an engine side 10c of hydraulic block 10, described in greater detail below.) Master brake cylinder receiving borehole 12 is designed, and connected to the at least one wheel connector 16, in such a way that a master brake cylinder 20 of the braking system is at least partially providable in master brake cylinder receiving borehole 12. Master brake cylinder 20 is providable in master brake cylinder receiving borehole 12 in such a way that a particular pressure in the at least one wheel brake cylinder 18 is increasable with the aid of master brake cylinder 20 during operation of the braking system (with the aid of the brake force exerted on at least one master brake cylinder piston 22a and 22b of master brake cylinder 20). For example, as schematically illustrated in FIG. 1c, a primary piston 22a (including a magnetic needle 23), a secondary piston 22b, at least one return spring 24, and/or at least one sealing ring 26 are/is introducible into master brake cylinder receiving borehole 12. An opening in master brake cylinder receiving borehole 12 at rear side 10b of hydraulic block 10 can be closeable with the aid of a cover 28, while components 30 for a pedal interface and for transmitting the brake force, exerted on brake pedal 14, to the at least one master brake cylinder piston 22a and 22b are mountable/fixable at an opening in master brake cylinder receiving borehole 12 on pedal side 10a of hydraulic block 10. Yet another receiving borehole for magnetic needle 23 is preferably provided in parallel to master brake cylinder receiving borehole 12.

Hydraulic block 10 also includes a plunger receiving borehole 32 provided therein which extends from engine side 10c of hydraulic block 10 in the direction of an opposite side/control device side 10d of hydraulic block 10 directed away from engine side 10c. (Engine side 10c and opposite side 10d each extend from pedal side 10a to rear side 10d.) Plunger receiving borehole 32 is designed, and connected to the at least one wheel connector 16, in such a way that a motorized plunger device 34 of the braking system is providable, with the aid of which the particular pressure in the at least one wheel brake cylinder 18 is variable during operation of the braking system by adjusting the at least one piston 36 of the motorized plunger device in plunger receiving borehole 32. Motorized plunger device 34 can thus be used, for example, for carrying out an autonomous brake application (by autonomously increasing the particular pressure in the at least one wheel brake cylinder 18 without a pedal actuation) and/or for blending a generator braking torque during deceleration of the motor vehicle with the aid of a generator, not illustrated, by adapting the particular pressure in the at least one wheel brake cylinder 18 to the generator braking torque.

The adjustment of the at least one piston 36 in plunger receiving borehole 32 takes place with the aid of an electric motor 38 of motorized plunger device 34, situated on engine side 10c of hydraulic block 10. In addition, hydraulic block 10 is designed in such a way that plunger receiving borehole 32 that extends from engine side 10c to opposite side/control device side 10d interpenetrates hydraulic block 10. Plunger receiving borehole 32 thus provides a sufficiently large adjustment volume for the at least one piston 36 of motorized plunger device 34, even when electric motor 38 is affixed directly on engine side 10c, for example with the aid of at least one screw 40. Due to the advantageous design of plunger receiving borehole 32, electric motor 38 can thus be affixed to hydraulic block 10 in a space-saving manner.

Hydraulic block 10, despite the multiplicity of functions that can be carried out in the braking system, is therefore a one-box system having a high level of integration of braking system components. In particular, hydraulic block 10 can be referred to as a one-box system that is optimized with regard to installation space and cost.

As one advantageous refinement, a simulator receiving borehole 42 that extends from a bottom side/simulator side 10e of hydraulic block 10 in the direction of a top side/reservoir side 10f of hydraulic block 10 directed away from bottom side 10e is also provided in hydraulic block 10. (Bottom side 10e and top side 10f each extend from pedal side 10a to rear side 10b, and from engine side 10c to opposite side 10d.) Simulator receiving borehole 42 is designed, and connected to master brake cylinder receiving borehole 12, in such a way that a simulator 44 of the braking system is at least partially providable in simulator receiving borehole 32. Brake fluid is thus displaceable into simulator 44 during operation of the braking system with the aid of the brake force exerted on brake pedal 14, for example. For example, a simulator piston 46, a simulator spring 48, and a spring seat 50 can be introducible into simulator receiving borehole 42. An opening in simulator receiving borehole 42 at bottom side/simulator side 10e of hydraulic block 10 can be sealable with the aid of a cover 52.

In hydraulic block 10 in the example embodiment of FIGS. 1a-1j, master brake cylinder receiving borehole 12 extends along a first center longitudinal axis 12a, and plunger receiving borehole 32 extends along a second center longitudinal axis 32a, perpendicular to first center longitudinal axis 12a, from engine side 10c to opposite side/control device side 10d of hydraulic block 10. Simulator receiving borehole 42 extends along a third center longitudinal axis 42a, provided perpendicular to second center longitudinal axis 32a and first center longitudinal axis 12a, from bottom side/simulator side 10e in the direction of top side/reservoir side 10f. Simulator 44 is thus integratable into hydraulic block 10 in a space-saving manner. Third center longitudinal axis 42a preferably extends in parallel to engine side 10c and to opposite side/control device side 10d. In this case, a stroke of simulator piston 46 is in parallel to engine side 10c and to opposite side/control device side 10d.

Opposite side/control device side 10d is preferably milled over, while engine side 10c, bottom side/simulator side 10e, and/or top side/reservoir side 10f are/is not milled over. Effort for milling over at least one of sides 10c, 10e, and 10f is thus dispensed with.

In addition, simulator receiving borehole 42 can penetrate only a relatively short area of hydraulic block 10 from bottom side/simulator side 10e in the direction of top side/reservoir side 10f. Therefore, a borehole that extends from bottom side/simulator side 10e to top side 10f is preferably not understood to mean simulator receiving borehole 42. Thus, despite equipping the braking system with simulator 44, an attachment area still remains on top side/reservoir side 10f for mounting a brake fluid reservoir 54 on top side 10f of hydraulic block 10. Thus, no conflict arises with respect to the cross bracing, generally situated on a bulkhead, when simulator 44 is provided or brake fluid reservoir 54 is mounted. This is a significant packaging advantage in the vehicle installation space. Reservoir connections 56a-56c can also be provided on top side/reservoir side 10f of hydraulic block 10 for connecting brake fluid reservoir 54 to various braking system components and brake fluid paths in hydraulic block 10.

A first reservoir connection 56a for connecting motorized plunger device 34 to brake fluid reservoir 54 can be provided in top side/reservoir side 10f of hydraulic block 10, vertically above plunger receiving borehole 32. First reservoir connection 56a at its inner end can be designed as a pressure relief valve receiving borehole 58 for situating a pressure relief valve 60 between plunger receiving borehole 32 and brake fluid reservoir 54. (Figure if shows a schematic cross section of a portion of hydraulic block 10 provided with first reservoir connection 56a.) An extension of pressure relief valve receiving borehole 58 can open into a pocket 61 situated in the area of plunger receiving borehole 52 (in particular, in the area of an inflow borehole to the flange). Thus, comparatively small hydraulic resistances occur during recharging/snifting of motorized plunger device 34. A second reservoir connection 56b can also provide receiving volume for a check valve 62 via which master brake cylinder 20 is connected to brake fluid reservoir 54. Since valves 60 and 62 are not electrically switched, situating them close to brake fluid reservoir 54 (and thus, separate from a control device 64 of the braking system, described below) is advantageous.

At least one valve receiving borehole that extends in each case from opposite side/control device side 10d in the direction of engine side 10c is advantageously provided in hydraulic block 10, and connected to the at least one wheel connector 16, to master brake cylinder receiving borehole 12, to plunger receiving borehole 32, and/or to simulator receiving borehole 42, in such a way that at least one electrically controllable valve of the braking system is situatable in the at least one valve receiving borehole, the valve being controllable during operation of the braking system with the aid of control device 64 of the braking system that is mounted/affixed on opposite side/control device side 10d (for example, with the aid of at least one screw 66). Control device 64 of the braking system can in particular be affixed directly on opposite side/control device side 10d. Since a design of motorized plunger device 34 that extends beyond opposite side/control device side 10d is not necessary, there is no need for a space to be present between control device 64 of the braking system and opposite side 10d. In addition, in the design of the control device it is not necessary to keep an installation space open for a portion of motorized plunger device 34 that protrudes at opposite side/control device side 10*d*.

In particular, in the example described here, four wheel outlet valve receiving boreholes 68 and four wheel inlet valve receiving boreholes 70 (as the at least one valve receiving borehole) are provided in opposite side/control device side 10*d*. Four wheel outlet valves 72 of the braking system are situatable in the four wheel outlet valve receiving boreholes 68. Similarly, four wheel inlet valves 74 of the braking system (each including a check valve 74*a* situated in parallel thereto) are introducible into the four wheel inlet valve receiving boreholes 70. (Wheel outlet valves 72 are controllable with the aid of control device 64 to release pressure from wheel brake cylinders 18 into brake fluid reservoir 54 during wheel locking. Wheel inlet valves 74 can be controlled by control device 64 for the controlled filling of wheel brake cylinders 18.)

The four wheel outlet valve receiving boreholes 68 are situated in succession along a first row extending in a direction from a first edge 10*d*-1 of opposite side/control device side 10*d* adjoining pedal side 10*a* to a second edge 10*d*-2 of opposite side 10*d* adjoining rear side 10*b*. The four wheel inlet valve receiving boreholes 70 are situated in succession along a second row extending in the direction from first edge 10*d*-1 of opposite side/control device side 10*d* to second edge 10*d*-2 of opposite side 10*d*. The first row of the four wheel outlet valve receiving boreholes 68 is situated closer to a third edge 10*d*-3 of opposite side/control device side 10*d*, adjoining top side/reservoir side 10*f*, than the second row of the four wheel inlet valve receiving boreholes 70. Master brake cylinder receiving borehole 12 can be situated at a level between the first row of the four wheel outlet valve receiving boreholes 68 and the second row of the four wheel inlet valve receiving boreholes 70. Thus, the design of master brake cylinder receiving borehole 12 does not negatively affect a possible depth of receiving boreholes 68 and 70.

A test valve receiving borehole 76 can optionally also be provided in the first row of wheel outlet valve receiving boreholes 68/between wheel outlet valve receiving boreholes 68. A test valve 78 can be inserted into test valve receiving borehole 76 (in parallel to check valve 62) between master brake cylinder receiving borehole 12 and brake fluid reservoir 54. The test valve can be advantageously used for air detection in the area of master brake cylinder 20.

In addition, at least one pressure sensor receiving opening 80 is preferably provided in opposite side/control device side 10*d* in such a way that at least one pressure sensor 82 of the braking system that in each case outputs at least one pressure signal to control device 64 during operation of the braking system is situatable in the at least one pressure sensor receiving opening 80, the at least one pressure sensor receiving opening 80 being situated between the first row of the four wheel outlet valve receiving boreholes 68 and the second row of the four wheel inlet valve receiving boreholes 70. Use can thus be made of the fact that the at least one pressure sensor receiving opening 80 already provides sufficient space for its particular pressure sensor 82, at a low depth, for advantageous compression of openings 12, 68, 70, and 80. Providing the at least one pressure sensor receiving opening 80 at the level of master brake cylinder receiving borehole 12, in particular at the level of first center longitudinal axis 12*a* of master brake cylinder receiving borehole 12, thus has hardly any negative effect on the ability to provide openings 12 and 80. Hydraulic block 10 is therefore also providable with a comparatively small thickness between sides 10*c* and 10*d*.

In the example embodiment described here, a linear position sensor receiving opening 84 is additionally provided in opposite side/control device side 10*d* in such a way that a linear position sensor 86 of the braking system that outputs at least one linear position signal to control device 64 during operation of the braking system is situatable in linear position sensor receiving opening 84, linear position sensor receiving opening 84 being situated between the first row of the four wheel outlet valve receiving boreholes 68 and third edge 10*d*-3 of opposite side/control device side 10*d*. Linear position sensor 86, which requires a comparatively large volume in hydraulic block 10 in comparison to wheel outlet valves 72 or wheel inlet valves 74, is thus situated far enough away from boreholes 12, 32, and 42 so that a depth of linear position sensor receiving opening 84 has no negative effect on the ability to provide openings 12, 32, and 42. In addition, situating linear position sensor 86 at a right angle to a guide borehole for a magnetic needle is easily achievable.

Plunger receiving borehole 32 is advantageously provided on opposite side/control device side 10*d* between the second row of the four wheel inlet valve receiving boreholes 70 and a fourth edge 10*d*-4 of opposite side/control device side 10*d* adjoining bottom side/simulator side 10*e* of hydraulic block 10. The design of plunger receiving borehole 32 thus has no negative effect on the ability to provide openings 12, 68, 70, 76, 80, and 84 described above. Situating plunger receiving borehole 32 closer to bottom side/simulator side 10*e* than master brake cylinder receiving borehole 12 is also preferred.

A first shutoff valve receiving opening 88*a* and a first plunger decoupling valve receiving opening 90*a* (as the at least one valve receiving borehole) can be additionally provided in opposite side/control device side 10*d* in such a way that a first shutoff valve 92*a* of the braking system is situatable in first shutoff valve receiving opening 88*a*, and a first plunger decoupling valve 94*a* of the braking system is situatable in first plunger decoupling valve receiving opening 90*a*, during operation of the braking system a brake fluid path through hydraulic block 10 from master brake cylinder receiving borehole 12 to a first wheel inlet valve receiving borehole 70 and a second wheel inlet valve receiving borehole 70 of the four wheel inlet valve receiving boreholes 70 being closeable with the aid of first shutoff valve 92, and a brake fluid path through hydraulic block 10 from plunger receiving borehole 32 to first wheel inlet valve receiving borehole 70 and second wheel inlet valve receiving borehole 70 being closeable with the aid of first plunger decoupling valve 94. First shutoff valve receiving opening 88*a* and first plunger decoupling valve receiving opening 90*a* are advantageously provided between first edge 10*d*-1 of opposite side/control device side 10*d* and plunger receiving borehole 32 in opposite side 10*d*. In this case, first plunger decoupling valve receiving opening 90*a* (for venting with the aid of the first plunger decoupling valve 94*a*) is preferably situated at a smaller distance from third edge 10*d*-3 of opposite side/control device side 10*d* than plunger receiving borehole 32, or at the same distance from third edge 10*d*-3 of opposite side 10*d* as plunger receiving borehole 32.

In addition, a second shutoff valve receiving opening 88*b* and a second plunger decoupling valve receiving opening 90*b* (as the at least one valve receiving borehole) can be additionally provided in opposite side/control device side 10*d* in such a way that a second shutoff valve 92*b* of the braking system is situatable in second shutoff valve receiving opening 88b and a second plunger decoupling valve 94b of the braking system is situatable in second plunger decoupling valve receiving opening 90b, during operation of the braking system a brake fluid path through hydraulic block 10 from master brake cylinder receiving borehole 12 to a third wheel inlet valve receiving borehole 70 and a fourth wheel inlet valve receiving borehole 70 of the four wheel inlet valve receiving boreholes 70 being closeable with the aid of second shutoff valve 92b, and a brake fluid path through hydraulic block 10 from plunger receiving borehole 32 to third wheel inlet valve receiving borehole 70 and fourth wheel inlet valve receiving borehole 70 being closeable with the aid of second plunger decoupling valve 94b, and second shutoff valve receiving opening 88b and second plunger decoupling valve receiving opening 90b being provided in opposite side 10d between second edge 10d-2 of opposite side/control device side 10d and plunger receiving borehole 32. In this case as well, second plunger decoupling valve receiving opening 90b (for venting with the aid of second plunger decoupling valve 94a) can be situated at a smaller distance from third edge 10d-3 of opposite side/control device side 10d than plunger receiving borehole 32, or at the same distance from third edge 10d-3 of opposite side 10d as plunger receiving borehole 32.

Furthermore, a simulator valve receiving opening 96 (as the at least one valve receiving borehole) can be additionally provided in opposite side/control device side 10d in such a way that a simulator valve 98 of the braking system (including a check valve 98a situated in parallel thereto) is situatable in simulator valve receiving opening 96, with the aid of which a brake fluid path through hydraulic block 10 from master brake cylinder receiving borehole 12 to simulator receiving borehole 42 is closeable during operation of the braking system with the aid of simulator valve 98. The simulator valve receiving opening is preferably provided between second edge 10d-2 of opposite side/control device side 10d and plunger receiving borehole 32 in opposite side 10b. Simulator valve 98 can be situated at the same distance from fourth edge 10d-4 of opposite side/control device side 10d as second shutoff valve 92b, or at a smaller distance from fourth edge 10d-4 of opposite side 10d than second shutoff valve 92b.

In the example embodiment described here, a rotation sensor receiving opening 100 is also provided in opposite side/control device side 10d in such a way that a rotation sensor 102 (for electric motor 38 of motorized plunger device 34) that outputs at least one rotation position signal to control device 64 during operation of the braking system is situatable in rotation sensor receiving opening 100. In hydraulic block 10 described here, rotation sensor receiving opening 100 is provided between fourth edge 10d-4 of opposite side/control device side 10b and plunger receiving borehole 32 in opposite side 10d. Rotation position sensor 102 is thus easily situatable close to electric motor 38. In particular, rotation position sensor 102 is situatable concentrically with respect to plunger receiving borehole 32.

At least one contact receiving opening 104a-104c can also be provided in opposite side 10d between fourth edge 10d-4 of opposite side/control device side 10d and plunger receiving borehole 32 in such a way that at least one contact 106a-106c is situatable in the at least one contact receiving opening 104a-104c, and at which a voltage signal and/or current signal can in each case be output, applied, or tapped with the aid of control device 64 during operation of the braking system. (A phase 106a-106c of an electrical contact 106a-106c can be used for each contact receiving opening 104a-104c.) Contact receiving openings 104a-104c are providable in particular on a semicircular path having a circle center in the center of plunger receiving borehole 32. In addition, rotation sensor receiving opening 100 on the semicircular path can also be provided with contact receiving openings 104a-104c.

As an optional refinement, hydraulic block 10 also has a leakage borehole 108 (closeable with the aid of a cover 107) that is provided in bottom side/simulator side 10e. Leakage borehole 108 is preferably situated in an area of hydraulic block 10 between plunger receiving borehole 32 and bottom side/simulator side 10e. Leakage borehole 108 can extend from bottom side/simulator side 10e in the direction of plunger receiving borehole 32. Since leakage borehole 108 requires only a comparatively small volume, it has little or no negative effect on the ability to provide boreholes 32, 100, and 104a-104c. In addition, leakage borehole 108 is situated in the area of hydraulic block 10 facing the earth's center, thus ensuring reliable collection of an escaping volume of brake fluid (due to leakage from motorized plunger device 34) via gravitation.

Figure 1E:
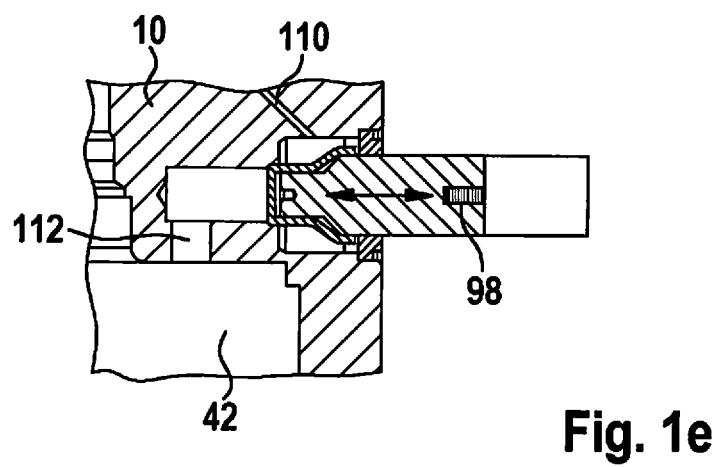
Figure 1F:
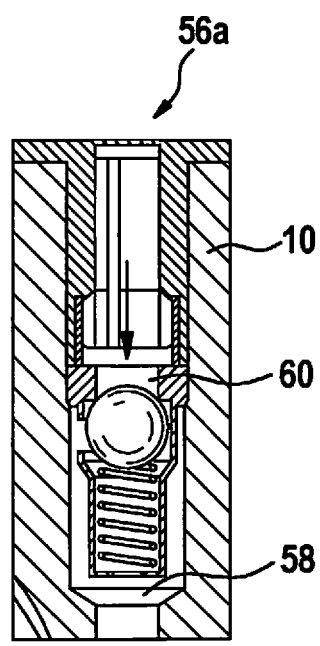

FIG. 1e shows a schematic cross section of a portion of hydraulic block 10 provided with simulator valve receiving opening 96. Also shown are a first section 110 and a second section 112 of a brake fluid path extending from master brake cylinder receiving borehole 12 to simulator receiving borehole 42, first section 110 being situated between master brake cylinder receiving borehole 12 and simulator valve receiving opening 96, and second section 112 being situated between simulator valve receiving opening 96 and simulator receiving borehole 42. As is apparent in FIG. 1e, a portion of first section 110 adjoining simulator valve receiving opening 96 is provided along an axis that is inclined by an angle between 10° and 80°, preferably by an angle between 25° and 75°, more preferably by an angle between 35° and 65°, with respect to opposite side/control device side 10d. (In comparison, a portion of second section 112 adjoining simulator valve receiving opening 96 extends along an axis that is essentially in parallel to opposite side/control device side 10d.) Pressure-assisted closing of simulator valve 98 is intensified due to the "sloped" design of the portion of first section 110 adjoining simulator valve receiving opening 96.

Figure 1G:
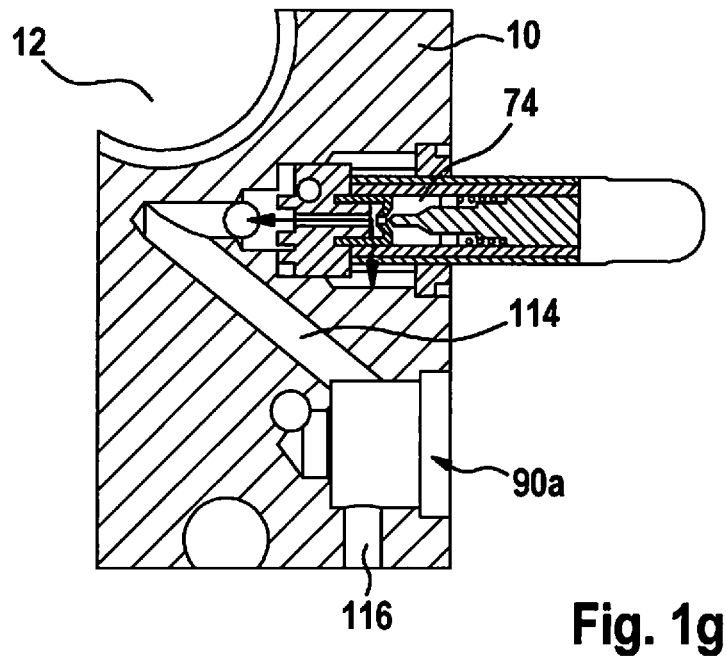
Figure 1H:
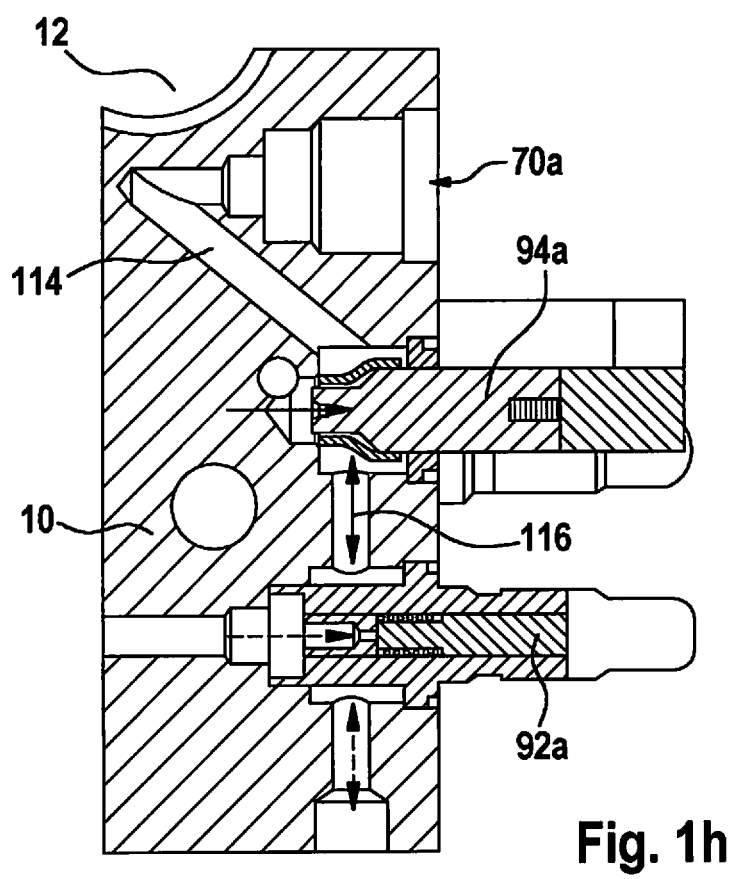

FIGS. 1g and 1h show schematic cross sections of portions of hydraulic block 10 that include wheel inlet valve receiving boreholes 70 or that include first shutoff valve receiving opening 88a and first plunger decoupling valve receiving opening 90a. A brake fluid path 114 extending between wheel inlet valve receiving boreholes 70 and first shutoff valve receiving opening 88a can also be provided along an axis that is inclined by an angle between 10° and 80°, preferably by an angle between 25° and 75°, more preferably by an angle between 35° and 65°, with respect to opposite side/control device side 10d. This improves the maintaining of pressure with the aid of wheel inlet valve 74 and first shutoff valve 92a used in each case. In contrast, for a brake fluid path 116 that extends between first shutoff valve receiving opening 88a and first plunger decoupling valve receiving opening 90a, a design along an axis (essentially) in parallel to opposite side/control device side 10d is preferred.

Figure 1I:
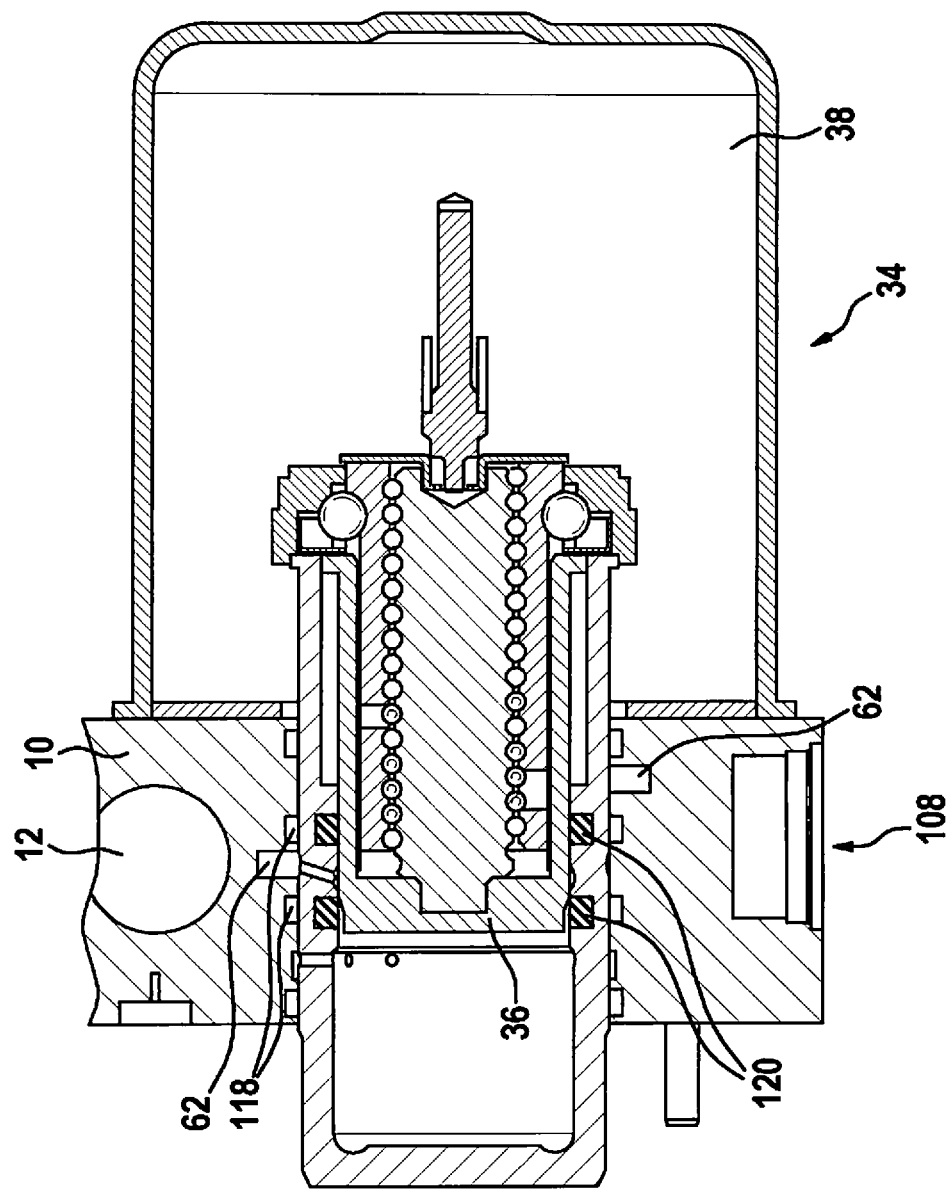
Figure 1J:
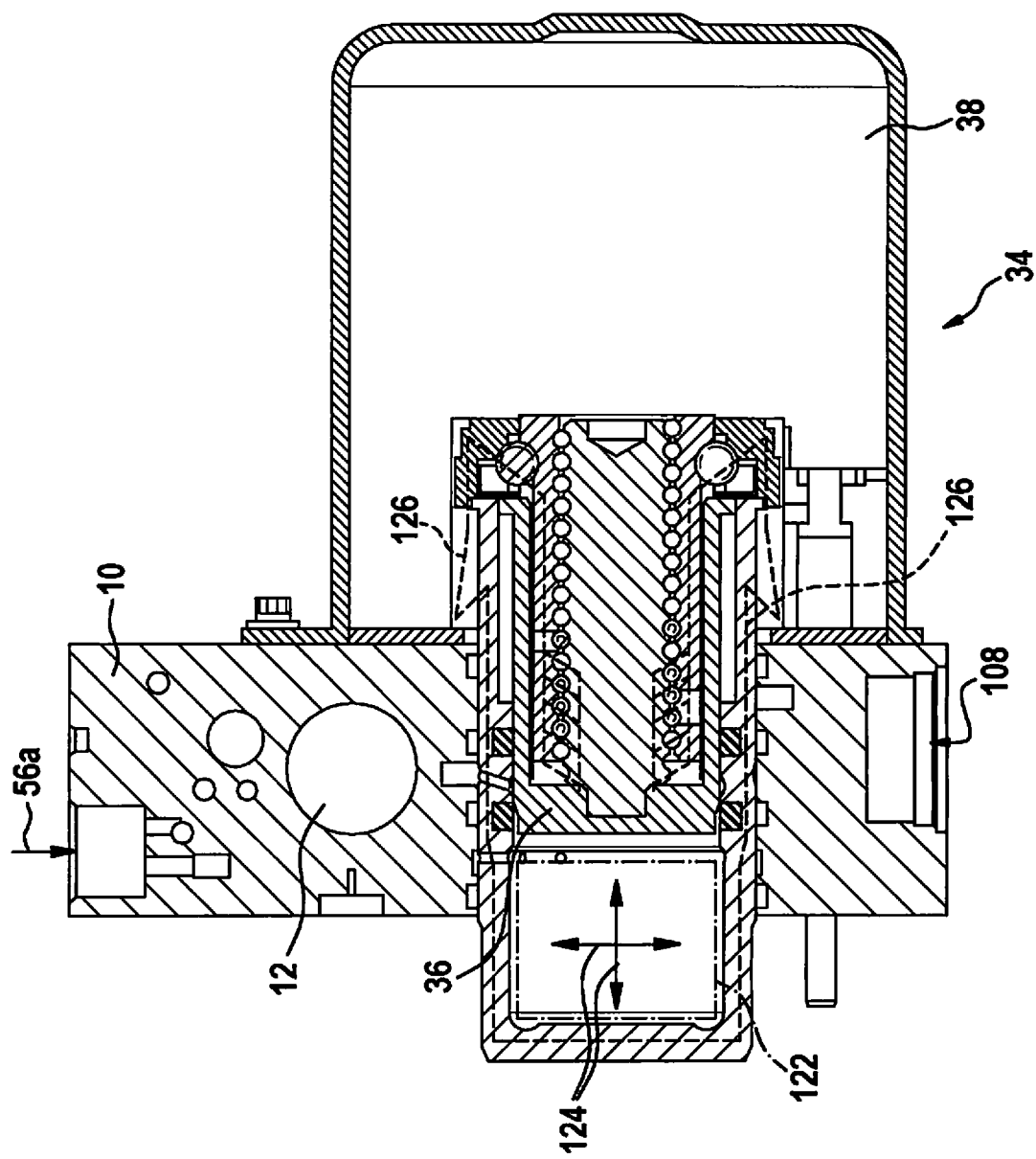

FIGS. 1i and 1j show schematic partial illustrations of motorized plunger device 34; there is no illustration of the individual components of electric motor 38 or of a thread via which the at least one piston 36 is connected to electric motor 38.

Radial recesses 118 are formed on plunger receiving borehole 32, via which brake fluid paths that are provided in hydraulic block 10 are connected to plunger receiving borehole 32. Also apparent are pockets 61, formed at plunger receiving borehole 32, via which the hydraulic outflows in the flange are achieved. Pockets 61 can also be referred to as pocket-shaped recesses, undercuts, rotationally radial recesses, and/or as lateral boreholes in the flange. Sealing rings/O-rings 120 ensure sealing between the flange and the housing. All sealing rings/O-rings 120 can have the same diameter. When all sealing rings/O-rings 120 have the same diameter, there is no direction of force during pressure generation with the aid of motorized plunger device 34. Thus, it is not necessary for forces to be supported via external fastening elements such as engine screws during the pressure generation with the aid of motorized plunger device 34. In addition, in this case more economical and space-saving elements can be used in the design of motorized plunger device 34.

Line 122 in FIG. 1j delimits the variable volume of motorized plunger device 34. Arrows 124 show the uniform pressure distribution within the variable volume during the pressure generation with the aid of motorized plunger device 34. As depicted by dashed lines 126 in FIG. 1j, there is also no direction of force during pressure generation with the aid of motorized plunger device 34.

Figure 2A:
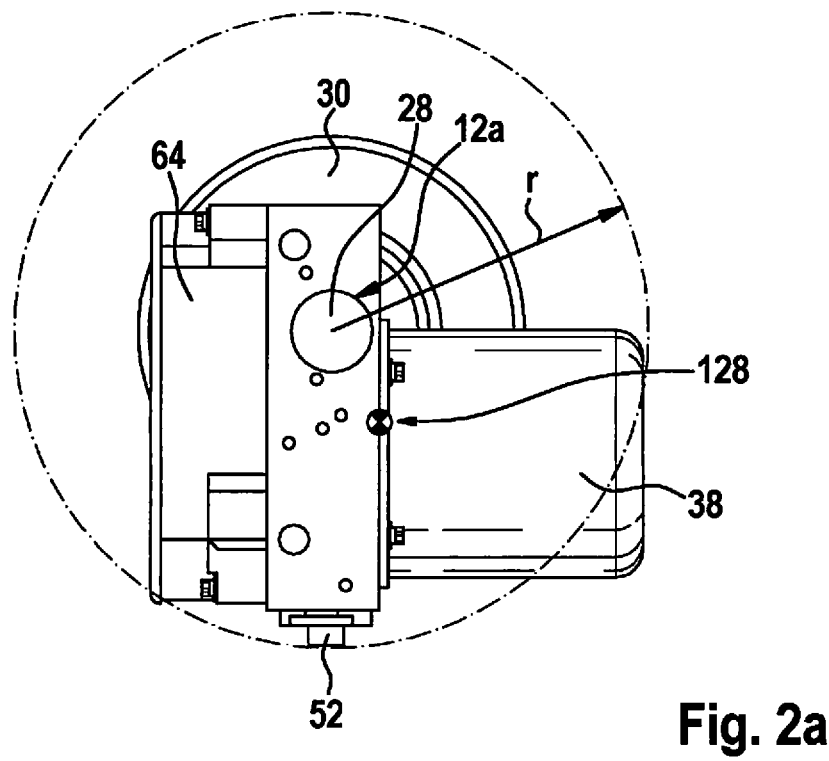
FIGS. 2a-2b show schematic overall illustrations of a second example embodiment of the hydraulic block and of the braking system equipped with same.
Figure 2B:
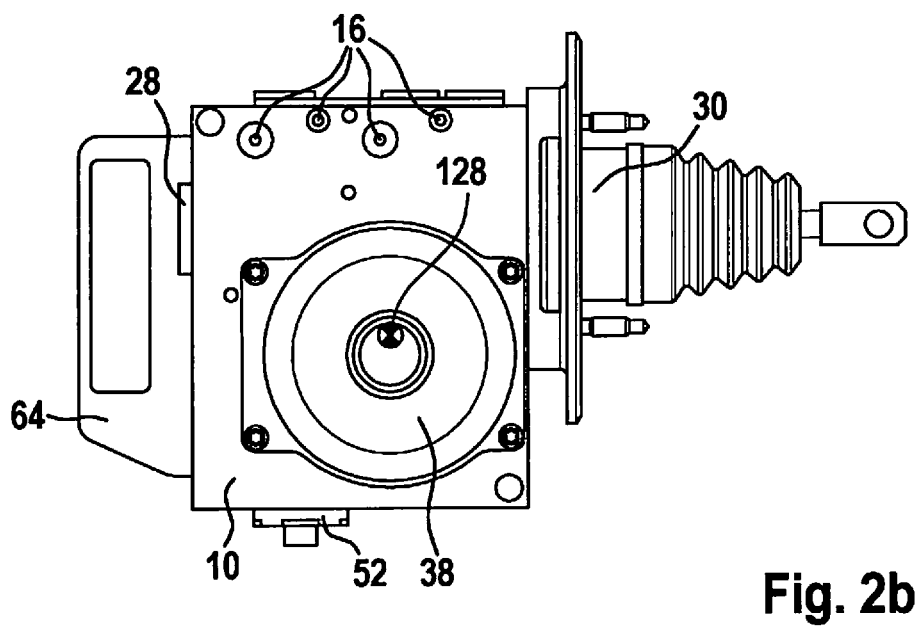

FIGS. 2a and 2b show schematic overall illustrations of a second example embodiment of the hydraulic block and of the braking system equipped with same.

The braking system depicted in FIGS. 2a and 2b can include all features of the example embodiment described above. Thus, the braking system in FIGS. 2a and 2b also provides all advantages of the example embodiment described above.

An arrangement of electric motor 38 of motorized plunger device 34 close to master brake cylinder 20/master brake cylinder receiving borehole 10 is also achieved in the braking system in FIGS. 2a and 2b. The arrangement of electric motor 38 and of control device 64 on hydraulic block 10 is simplified due to the flat interfaces of hydraulic block 10 with electric motor 38 and with control device 64. Virtually all components of the braking system are situatable within a maximum radius r of 9 inches (9*2.54 cm=22.86 cm) about first center longitudinal axis 12a. A center of gravity 128 is situated in such a way that reliable holding of the braking system mounted on a bulkhead 11 is ensured. Center of gravity 128 is also situated close to master brake cylinder 20. Electric motor 38 of motorized plunger device 34 can also be affixed egocentrically close to bulkhead 11. In addition, plunger receiving borehole 32 can be provided closer to pedal side 10a than to rear side 10b. In this case, electric motor 38 is situated closer to brake pedal 14, which additionally improves stability of the braking system mounted on bulkhead 11.

Hydraulic blocks 10 described above can in each case be manufactured in a comparatively small size and with relatively low weight. In addition, hydraulic blocks 10 described above can be manufactured with a reduced material usage in comparison to the related art.

What is claimed is:

1. A cuboidal hydraulic block for a braking system of a motor vehicle, the hydraulic block comprising:
   at least one wheel connector to which at least one wheel brake cylinder of the braking system is connectable;
   a master brake cylinder receiving borehole that:
      extends from a pedal side of the hydraulic block towards an opposite rear side of the hydraulic block; and
      is connected to the at least one wheel connector such that a master brake cylinder of the braking system is at least partially providable in the master brake cylinder receiving borehole, so that a pressure in the at least one wheel brake cylinder is increasable during operation of the braking system;
   a plunger receiving borehole, which is spaced from the master cylinder receiving borehole, wherein the plunger receiving borehole:
      extends through the hydraulic block from and through an engine side of the hydraulic block towards and through an opposite side of the hydraulic block; and
      is connected to the at least one wheel connector such that the pressure in the at least one wheel brake cylinder is variable during operation of the braking system by adjusting, using an electric motor of a motorized piston device that is situated on the motor side, a piston of the motorized plunger device in the plunger receiving borehole; and
   a simulator receiving borehole that extends from a bottom side of the hydraulic block towards a top side of the hydraulic block and that is connected to the master brake cylinder receiving borehole and in which a simulator of the braking system is at least partially providable;
   wherein:
      the master brake cylinder receiving borehole extends from the pedal side towards the opposite rear side along a first center longitudinal axis;
      the plunger receiving borehole extends from and through the engine side towards and through the opposite side of the hydraulic block along a second center longitudinal axis that is perpendicular to the first center longitudinal axis; and
      the simulator receiving borehole extends from the bottom side towards the top side along a third center longitudinal axis that is perpendicular to the first and second center longitudinal axes.

2. The hydraulic block of claim 1, further comprising at least one valve receiving borehole:
   in which at least one electrically controllable valve of the braking system is situatable;
   that each extends from the opposite side towards the engine side and is connected to at least one of the at least one wheel connector, the master brake cylinder receiving borehole, the plunger receiving borehole, and the simulator receiving borehole; and
   that, during operation of the braking system, is controllable using a control device of the braking system that situated on the opposite side.

3. The hydraulic block of claim 2, wherein:
   the at least one valve receiving borehole includes a first shutoff valve receiving opening in which a first shutoff valve of the braking system is situatable and a first plunger decoupling valve receiving opening in which a first plunger decoupling valve of the braking system is situatable;
   during operation of the braking system:
      a brake fluid path through the hydraulic block from the master brake cylinder receiving borehole to a first wheel inlet valve receiving borehole and a second wheel inlet valve receiving borehole of the four wheel inlet valve receiving boreholes is closeable via the first shutoff valve; and
      a brake fluid path through the hydraulic block from the plunger receiving borehole to the first wheel inlet valve receiving borehole and the second wheel inlet valve receiving borehole is closeable via the first plunger decoupling valve; and the first shutoff valve receiving opening and the first plunger decoupling valve receiving opening are between the first edge of the opposite side and the plunger receiving borehole in the opposite side.

4. The hydraulic block of claim 2, wherein:

the at least one valve receiving borehole includes a shutoff valve receiving opening and a plunger decoupling valve receiving opening in the opposite side;

a shutoff valve of the braking system is situatable in the shutoff valve receiving opening;

a plunger decoupling valve of the braking system is situatable in the plunger decoupling valve receiving opening;

during operation of the braking system:

a brake fluid path through the hydraulic block from the master brake cylinder receiving borehole to a first wheel inlet valve receiving borehole and a second wheel inlet valve receiving borehole of the four wheel inlet valve receiving boreholes is closeable via the shutoff valve; and a brake fluid path through the hydraulic block from the plunger receiving borehole to the first wheel inlet valve receiving borehole and the second wheel inlet valve receiving borehole is closeable via the plunger decoupling valve; and the shutoff valve receiving opening and the plunger decoupling valve receiving opening are between the second edge of the opposite side and the plunger receiving borehole in the opposite side.

5. The hydraulic block of claim 2, wherein:

the at least one valve receiving borehole includes a simulator valve receiving opening that is situated in the opposite side between the second edge of the opposite side and the plunger receiving borehole in the opposite side, and in which a simulator valve of the braking system is situatable; and during operation of the braking system, a brake fluid path through the hydraulic block from the master brake cylinder receiving borehole to the simulator receiving borehole is closeable via the simulator valve.

6. The hydraulic block of claim 5, wherein a section of a brake fluid path that extends from the master brake cylinder receiving borehole to the simulator receiving borehole includes a section that extends from master brake cylinder receiving borehole to the simulator valve receiving opening and that includes a portion that (a) adjoins the simulator valve receiving opening and (b) extends along an axis that is inclined by an angle between 10° and 80° with respect to the opposite side.

7. The hydraulic block of claim 2, further comprising a rotation sensor receiving opening:

in the opposite side and between the fourth edge of the opposite side and the plunger receiving borehole in the opposite side; and in which a rotation sensor of the braking system, which is configured to output at least one rotation position signal to the control device during operation of the braking system, is situatable.

8. The hydraulic block of claim 2, further comprising at least one contact receiving opening:

in the opposite side between the fourth edge of the opposite side and the plunger receiving borehole in the opposite side; and in which at least one contact of the braking system, at each of which at least one of a voltage signal and a current signal can be output, applied, or tapped via the control device during operation of the braking system, is situatable.

9. The hydraulic block of claim 1, wherein the opposite side is milled over, and at least one of the engine side, the bottom side, and the top side is not milled over.

10. The hydraulic block as recited in claim 1, further comprising:

the motorized piston device including the electric motor and the piston, the electric motor being mounted on the motor side of the hydraulic block, wherein the motorized piston device extends in the plunger receiving borehole through the hydraulic block from and through the engine side of the hydraulic block towards and through the opposite side of the hydraulic block.

11. A cuboidal hydraulic block for a braking system of a motor vehicle, the hydraulic block comprising:

at least one wheel connector to which at least one wheel brake cylinder of the braking system is connectable;

a master brake cylinder receiving borehole that:

extends from a pedal side of the hydraulic block towards an opposite rear side of the hydraulic block; and is connected to the at least one wheel connector such that a master brake cylinder of the braking system is at least partially providable in the master brake cylinder receiving borehole, so that a pressure in the at least one wheel brake cylinder is increasable during operation of the braking system;

a plunger receiving borehole, which is spaced from the master cylinder receiving borehole, wherein the plunger receiving borehole:

extends through the hydraulic block from and through an engine side of the hydraulic block towards and through an opposite side of the hydraulic block; and is connected to the at least one wheel connector such that the pressure in the at least one wheel brake cylinder is variable during operation of the braking system by adjusting, using an electric motor of a motorized piston device that is situated on the motor side, a piston of the motorized plunger device in the plunger receiving borehole; and at least one valve receiving borehole:

in which at least one electrically controllable valve of the braking system is situatable;

that each extends from the opposite side towards the engine side and is connected to at least one of the at least one wheel connector, the master brake cylinder receiving borehole, the plunger receiving borehole, and the simulator receiving borehole; and that, during operation of the braking system, is controllable using a control device of the braking system that situated on the opposite side;

wherein:

the at least one valve receiving borehole include at least four wheel outlet valve receiving boreholes and four wheel inlet valve receiving boreholes in the opposite side;

four wheel outlet valves of the braking system are situatable in the four wheel outlet valve receiving boreholes;

four wheel inlet valves of the braking system are situatable in the four wheel inlet valve receiving boreholes;

the four wheel outlet valve receiving boreholes are situated in succession along a first row extending in a direction from a first edge of the opposite side adjoining the pedal side to a second edge of the opposite side adjoining the rear side;

the four wheel inlet valve receiving boreholes are situated in succession along a second row extending in the direction from the first edge of the opposite side to the second edge of the opposite side; and the first row of the four wheel outlet valve receiving boreholes is situated closer to a third edge of the opposite side, adjoining the top side, than the second row of the four wheel inlet valve receiving boreholes.

12. The hydraulic block of claim 11, further comprising a linear position sensor receiving opening in the opposite side between the first row of the four wheel outlet valve receiving boreholes and the third edge of the opposite side, in which a linear position sensor of the braking system, which is configured to output at least one linear position signal to the control device during operation of the braking system, is situatable.

13. The hydraulic block of claim 11, further comprising at least one pressure sensor receiving opening in the opposite side between the first row of the four wheel outlet valve receiving boreholes and the second row of the four wheel inlet valve receiving boreholes, in which at least one pressure sensor of the braking system, which is configured to output at least one pressure signal to the control device during operation of the braking system, is situatable.

14. The hydraulic block of claim 11, wherein the plunger receiving borehole is situated on the opposite side between the second row of the four wheel inlet valve receiving boreholes and a fourth edge of the opposite side adjoining the bottom side of the hydraulic block.

15. A braking system for a motor vehicle, the braking system comprising:
a master brake cylinder;
at least one wheel brake cylinder;
motorized plunger device including an electric motor and a piston; and
a cuboidal hydraulic block that includes:
at least one wheel connector to which the at least one wheel brake cylinder is connectable;
a master brake cylinder receiving borehole that:
extends from a pedal side of the hydraulic block towards an opposite rear side of the hydraulic block; and
is connected to the at least one wheel connector such that the master brake cylinder is at least partially provided in the master brake cylinder receiving borehole, so that a pressure in the at least one wheel brake cylinder is increasable during operation of the braking system;
a plunger receiving borehole that:
extends through the hydraulic block from and through an engine side of the hydraulic block towards and through an opposite side of the hydraulic block; and
is connected to the at least one wheel connector such that the pressure in the at least one wheel brake cylinder is variable during operation of the braking system by adjusting, using the electric motor, which is situated on the motor side, the piston of the motorized plunger device in the plunger receiving borehole, the motorized piston device extending in the plunger receiving borehole through the hydraulic block from and through the engine side of the hydraulic block towards and through the opposite side of the hydraulic block; and
a simulator receiving borehole that extends from a bottom side of the hydraulic block towards a top side of the hydraulic block and that is connected to the master brake cylinder receiving borehole and in which a simulator of the braking system is at least partially providable;
wherein:
the master brake cylinder receiving borehole extends from the pedal side towards the opposite rear side along a first center longitudinal axis;
the plunger receiving borehole extends from and through the engine side towards and through the opposite side of the hydraulic block along a second center longitudinal axis that is perpendicular to the first center longitudinal axis; and
the simulator receiving borehole extends from the bottom side towards the top side along a third center longitudinal axis that is perpendicular to the first and second center longitudinal axes.

16. A cuboidal hydraulic block for a braking system of a motor vehicle, the hydraulic block comprising:
at least one wheel connector to which at least one wheel brake cylinder of the braking system is connectable;
a master brake cylinder receiving borehole that:
extends from a pedal side of the hydraulic block towards an opposite rear side of the hydraulic block; and
is connected to the at least one wheel connector such that a master brake cylinder of the braking system is at least partially providable in the master brake cylinder receiving borehole, so that a pressure in the at least one wheel brake cylinder is increasable during operation of the braking system;
a plunger receiving borehole, which is spaced from the master cylinder receiving borehole, wherein the plunger receiving borehole:
extends through the hydraulic block from and through an engine side of the hydraulic block towards and through an opposite side of the hydraulic block; and
is connected to the at least one wheel connector such that the pressure in the at least one wheel brake cylinder is variable during operation of the braking system by adjusting, using an electric motor of a motorized piston device that is situated on the motor side, a piston of the motorized plunger device in the plunger receiving borehole;
a simulator receiving borehole that extends from a bottom side of the hydraulic block towards a top side of the hydraulic block and that is connected to the master brake cylinder receiving borehole and in which a simulator of the braking system is at least partially providable; and
at least one valve receiving borehole:
in which at least one electrically controllable valve of the braking system is situatable;
that each extends from the opposite side towards the engine side and is connected to at least one of the at least one wheel connector, the master brake cylinder receiving borehole, the plunger receiving borehole, and the simulator receiving borehole; and
that, during operation of the braking system, is controllable using a control device of the braking system that situated on the opposite side;

wherein:
the at least one valve receiving borehole include at least four wheel outlet valve receiving boreholes and four wheel inlet valve receiving boreholes in the opposite side;
four wheel outlet valves of the braking system are situatable in the four wheel outlet valve receiving boreholes;
four wheel inlet valves of the braking system are situatable in the four wheel inlet valve receiving boreholes;
the four wheel outlet valve receiving boreholes are situated in succession along a first row extending in a direction from a first edge of the opposite side adjoining the pedal side to a second edge of the opposite side adjoining the rear side;
the four wheel inlet valve receiving boreholes are situated in succession along a second row extending in the direction from the first edge of the opposite side to the second edge of the opposite side; and
the first row of the four wheel outlet valve receiving boreholes is situated closer to a third edge of the opposite side, adjoining the top side, than the second row of the four wheel inlet valve receiving boreholes.

* * * * *